(No Model.)
C. D. CASADA & R. A. HENDERSON.
WOODEN PULLEY.
No. 369,586. Patented Sept. 6, 1887.
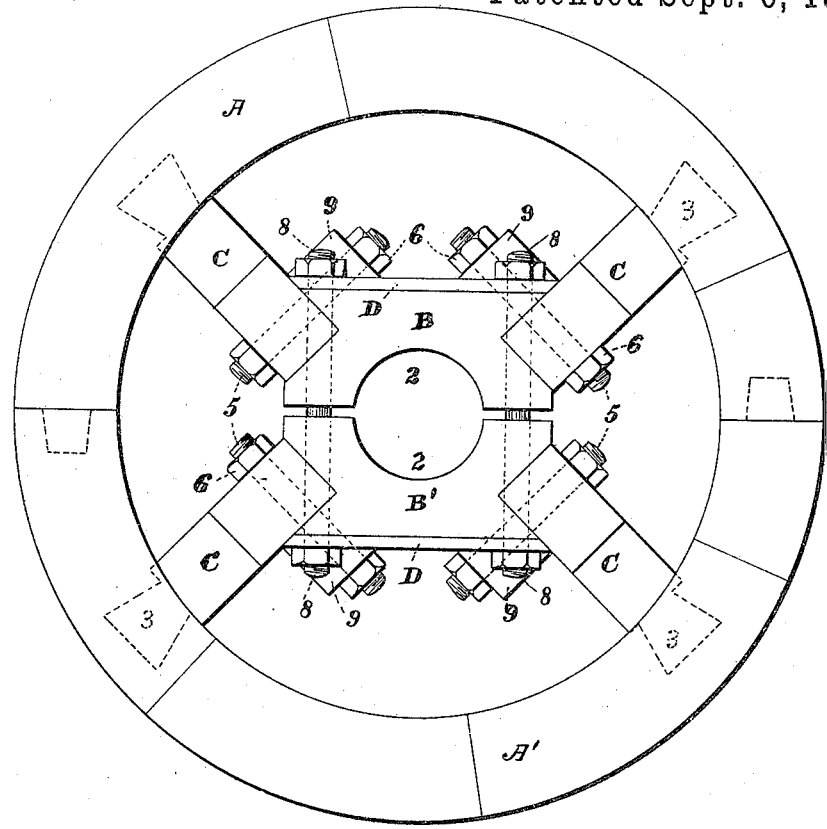
FIG. I.
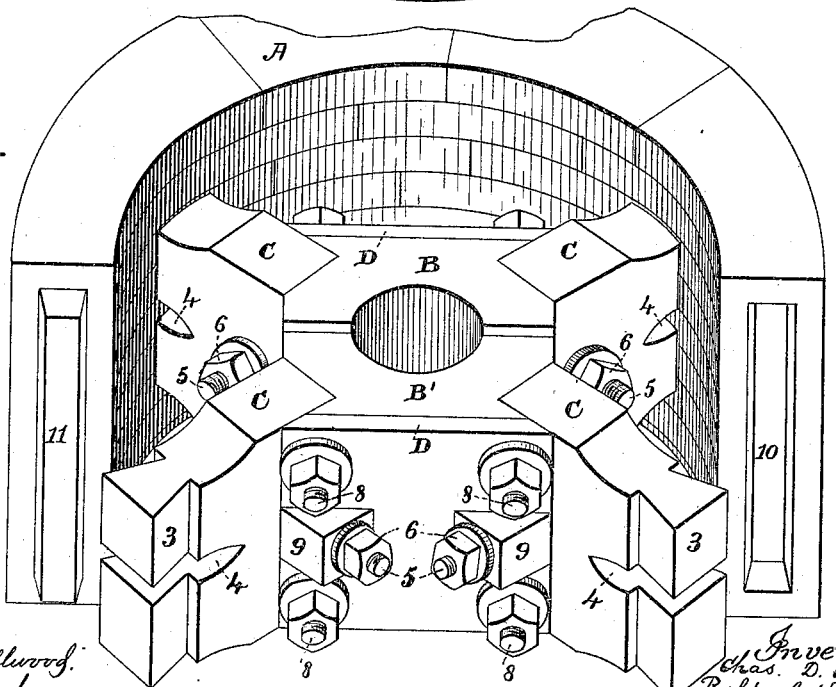
FIG. II.

UNITED STATES PATENT OFFICE.

CHARLES D. CASADA AND ROBERT A. HENDERSON, OF CHATTANOOGA, TENNESSEE, ASSIGNORS OF ONE-THIRD TO GEORGE N. HENSON, OF SAME PLACE.

WOODEN PULLEY.

SPECIFICATION forming part of Letters Patent No. 369,586, dated September 6, 1887.

Application filed May 11, 1887. Serial No. 237,827. (No model.)

*To all whom it may concern:*

Be it known that we, CHARLES D. CASADA and ROBERT A. HENDERSON, both of Chattanooga, Hamilton county, Tennessee, have invented a new and useful Improvement in Wooden Pulleys, which improvement is fully set forth in the following specification.

This invention relates to the construction of wooden pulleys, and has for its object to secure greater strength and durability than is attainable as such pulleys are ordinarily made.

The invention has particular reference to the mode of attaching the hub to the rim, for which purpose radial arms are employed, being bolted at one end to the hub and at the other secured to the rim by dovetailed tenons and mortises.

The hub is composed of two blocks, so that it can readily be applied to or detached from the shaft. One face of each block (preferably that transverse to the grain of the wood) is grooved out, so as to form, when the blocks are put together, an opening of proper size for the shaft. The two blocks are bolted together. They are cut out at the four corners to fit the squared ends of the radial arms. Oblique bolts secure these arms to the hub, the heads of the bolts bearing against iron plates placed at the ends of the hub, these plates also serving to brace the arms. The dovetailed ends of the radial arms are cut or notched out longitudinally, so that by pressure against the ends of the dovetailed grooves or mortises in the rim the arms take a firmer hold thereof.

In the accompanying drawings, which form a part of this specification, Figure I is a side elevation of a wooden pulley constructed in accordance with the invention; and Fig. II, a perspective view, part of the rim being removed.

The hub of the pulley is composed of two blocks, B B', placed end to end, each block having a semi-cylindrical groove, 2, cut therein. The rim is also composed of two parts, A A', each made of separate layers or strips of wood nailed, glued, or otherwise fastened together until the desired thickness is attained.

Four dovetailed grooves are cut out of the rim for the reception of the dovetailed tenons 3 on the ends of the radial arms C. The tenons 3 are of course put in place in their mortises before the outside strips composing the rim A are secured in place. In order to give a certain amount of spring to the dovetailed ends of arms C, they are notched out lengthwise, as shown at 4, Fig. II.

The inner ends of arms C are squared, and the blocks B B' are cut out at the corners to form sockets to receive these ends, and they are securely held in place by oblique bolts 5 and nuts 6. The arms C are each diametrically opposite one of the other arms, so that they firmly brace each other, as well as the hub and rim.

At the ends of blocks B B' are bracing-plates or saddles D, of cast-iron, having their ends beveled to fit accurately the arms C and form braces therefor. The bolts 5, which secure the arms C in place, as well as the bolts 8, which clamp the two parts of the hub against the shaft, pass through and bear against the plates D, which prevent the heads of the bolts sinking into the wood. Wedge-shaped lugs 9 are cast upon plates D to form bearings for the nuts 6, which clamp the bolts 5.

The meeting ends of the two parts A A' of the wooden rim are provided with mortises 10 and corresponding tenons, 11, to keep the two parts of the rim in their proper relative positions and prevent displacement under strain and pressure in running.

The construction shown is such as to permit the pulley to be readily applied to and detached from a shaft, and while the parts are few in number they are so applied as to constitute a strong and durable structure.

It is obvious that parts of the invention may be used without the whole, and that modifications may be made in details of construction without departing from the spirit of the invention.

We claim—

1. In a wooden pulley, the combination, with the rim and hub, of the radial arms bolted at one end to the hub and at the other secured to the rim by dovetailed tenons and mortises, substantially as described.

2. The combination, with the two-part rim and two-part hub, of the radial arms bolted to the hub at the corners and at their outer ends having dovetailed tenons entering mortises in said rim, substantially as described.

3. The combination, with the rim and radial bracing-arms, of the hub formed of two blocks of wood having grooves cut for the shaft transverse to the grain of the wood and bolts for clamping the hub to the shaft, substantially as described.

4. The combination, with the hub and rim, of the arms connecting the same, said arms radiating from the four corners of the hub and being secured thereto by oblique bolts, substantially as described.

5. The combination of the rim, the two-part hub, the radial arms, the bolts for clamping the hub to the shaft, the bolts for securing the arms to the hub, and the bracing-plates at the ends of the hub, against which the heads of said bolts bear, substantially as described.

6. The combination, with the hub and rim, of the radial arms bolted to the hub and connecting with the rim by dovetailed tenons and mortises, said arms being notched longitudinally at the dovetailed ends, substantially as described.

In testimony whereof we have signed this specification in the presence of two subscribing witnesses.

CHAS. D. CASADA.
ROBT. A. HENDERSON.

Witnesses:
J. T. ALEXANDER,
THOS. M. CAROTHERS.